United States Patent [19]

West

[11] 4,356,545
[45] Oct. 26, 1982

[54] APPARATUS FOR MONITORING AND/OR CONTROLLING THE OPERATIONS OF A COMPUTER FROM A REMOTE LOCATION

[75] Inventor: Kenneth J. West, Hopkinton, Mass.

[73] Assignee: Data General Corporation, Westboro, Mass.

[21] Appl. No.: 62,954

[22] Filed: Aug. 2, 1979

[51] Int. Cl.³ .......................... G06F 3/04; H04M 11/00
[52] U.S. Cl. .................................. 364/200; 179/1 C; 179/2 DP; 179/175.2 C
[58] Field of Search ...... 179/2 DP, 175.2 C, 175.2 R, 179/1 C, 2 C; 364/200 MS File, 900 MS File; 370/85; 178/2 D

[56] References Cited

U.S. PATENT DOCUMENTS

| | | | |
|---|---|---|---|
| 3,227,806 | 1/1966 | Kreuzer | 179/3 |
| 3,524,935 | 8/1970 | Gonsewski et al. | 179/2 DP |
| 3,544,721 | 12/1970 | Geen | 179/2 DP |
| 3,618,031 | 11/1971 | Kennedy | 364/200 |
| 3,676,858 | 7/1972 | Finch et al. | 364/200 |
| 3,697,693 | 10/1972 | Deschenes et al. | 179/2 DP |
| 3,773,973 | 11/1973 | Kennedy | 179/2 C |
| 3,889,062 | 6/1975 | Epstein | 364/200 |
| 4,048,672 | 9/1977 | Seiden et al. | 364/200 |
| 4,109,309 | 8/1978 | Johnstone et al. | 364/900 |

Primary Examiner—Gareth D. Shaw
Assistant Examiner—Eddie P. Chan
Attorney, Agent, or Firm—Jacob Frank; Joel Wall; Irving M. Kriegsman

[57] ABSTRACT

Apparatus for monitoring and/or controlling the operations of a computer at a user site from a support center over a telephone line, the computer at the user site including a central processing unit (CPU) and a display terminal. The apparatus includes a telephone instrument at each location connected to the telephone line, a display terminal connected to an acoustic coupler at the support center and a control and switching device at the user site connected to the CPU, to the display terminal at the user site and to an acoustic coupler. When a link is established between the acoustic coupler at the support center and the acoustic coupler at the user site over the telephone line, the display terminal at the support center is operable with the display terminal at the user site in either an on-line mode or a conversational mode. In the on-line mode, either display terminal can input to the CPU and the output from the CPU is displayed at both display terminals. In the conversational mode, the CPU is disengaged and inputs from either display terminal are displayed at both display terminals. In the absence of the link, the display terminal at the user site is operable with the CPU through the control and switching device.

12 Claims, 3 Drawing Figures phone instruments at each location being connected to a

APPARATUS FOR MONITORING AND/OR CONTROLLING THE OPERATIONS OF A COMPUTER FROM A REMOTE LOCATION

BACKGROUND OF THE INVENTION

The present invention relates to an apparatus for monitoring and/or controlling the operations of a computer and more particularly, to an apparatus for monitoring and/or controlling the operations of a computer from a remote location over a telephone line.

It is not uncommon for computer system users to experience hardware, software or operational problems in the day-to-day use of their equipment. In some instances the problems are such that they can be diagnosed and/or corrected by on-site personnel; however, in most cases the user does not possess the technical skills needed to properly diagnose and then correct the fault. When this occurs it is generally necessary to obtain outside assistance from a technical expert at a support center.

In the past, attempts have been made to diagnose and correct operational problems by calling the support center over a telephone and describing to a technical expert at the support center what appears to be the particular problem. This technique has not proven to be very successful, mainly because of the inability of the person at the user site to accurately describe the problem and/or what he is actually observing on his display terminal. Furthermore, the technique does not enable the technical expert to actually control the operations of the computer at the user site.

Another technique that has been employed in the past has involved connecting the CPU and the display terminal at the user site to an acoustic coupler through a double throw switch. When the switch is placed in one position the CPU is connected to the display terminal and is operable with the display terminal as a user site computer. When the switch is placed in the other position the CPU is connected to the acoustic coupler. Using this arrangement it is possible to connect the CPU to either the display terminal at the user site or through a telephone link and second acoustic coupler to a display terminal at the support center. The basic problem with this technique is that although it allows either the display terminal at the user site or the display terminal at the support center to be connected to the CPU it does not allow both display terminals to be connected to and be in communication with the CPU at the same time. Thus, it does not enable a person at the support center to monitor operations of the display terminal at the user site or the operator at the user site to observe the communications between the display terminal at the support center and the CPU. In addition, once the telephone instruments at each location are inserted into their respective acoustic couplers there is no way for the person at one location to signal to the person at the other location to remove the telephone instrument from the acoustic coupler if the person wants to reestablish voice communications or return to the original operating mode.

As a result, the technique that has been most frequently employed to diagnose problems and provide assistance has been to send an expert from the support center to the user site. As can be appreciated, this technique is time consuming, often very expensive and not very practical in the case of minor problems. In addition, it is often very difficult after a period of time has elapsed to recreate the specific problem or the same conditions that caused the problem.

SUMMARY OF THE INVENTION

According to the teachings of this invention there is provided an apparatus which enables monitoring and/or controlling the operation of a computer at a user site from a support center over a telephone line, the computer at the user site including a CPU and a display terminal. The apparatus includes a display terminal at the support center and a control and switching device at the user site. The control and switching device is connected to the CPU, to the display terminal at the user site and is coupled through a telephone link to the display terminal at the support center. The control and switching device performs a variety of functions including controlling the flow of data between the CPU and the two display terminals.

In the absence of a telephone link with the display terminal at the support center the display terminal at the user site communicates with the CPU through the control and switching device as if directly connected to the CPU.

Once the telephone link has been established the display terminal at the support center is operable with the display terminal at the user site in either an on-line mode or a conversational mode. In the on-line mode either display terminal can input to the CPU and the output from the CPU is displayed at both display terminals. Thus, personnel at the support center can observe communications between the CPU and display terminal at the user site and personnel at the user site can observe communications between the CPU and the display terminal at the support center. In the conversational mode the CPU is disengaged and inputs from either display terminal are displayed at both terminals. This allows personnel at both locations to communicate with each other through their display terminals. Mode changes are accomplished by depressing an appropriate key on the keyboard of either display terminal. A prompt character is presented to each display terminal each time the mode is changed.

In a preferred embodiment of the invention, the telephone link is established using a telephone instrument and an acoustic coupler at each location, with the telephone line, the acoustic coupler at the support center being connected to the display terminal at the support center and the acoustic coupler at the user site being connected to the control and switching device. This enables the support center and user site to communicate in a voice mode through their respective telephone instruments and utilizes telephone instruments which in most all cases are already at each location. However, if desired, the telephone link may be established using a modem with or without a telephone instrument at either or both locations. If, of course, the coupling is achieved using a modem without a telephone instrument at either location, voice communications cannot be achieved without going to a separate telephone line.

As can be appreciated, the invention does not require hardware or software changes in the CPU and display unit at the user site, does not require the display terminal at the user site to be identical to the display terminal at the support center and uses conventional acoustic couplers and telephone instruments.

BRIEF DESCRIPTION OF THE DRAWINGS

Other features and advantages of the invention will become more readily apparent from the following detailed description of a specific embodiment of the invention when taken in conjunction with the accompanying drawings wherein like reference numerals represent like parts and wherein.

DETAILED DESCRIPTION OF PREFERRED EMBODIMENT

The present invention relates to an apparatus which allows personnel at a support center to monitor and/or control the operations of a computer at a user site over a telephone line.

Figure 1:
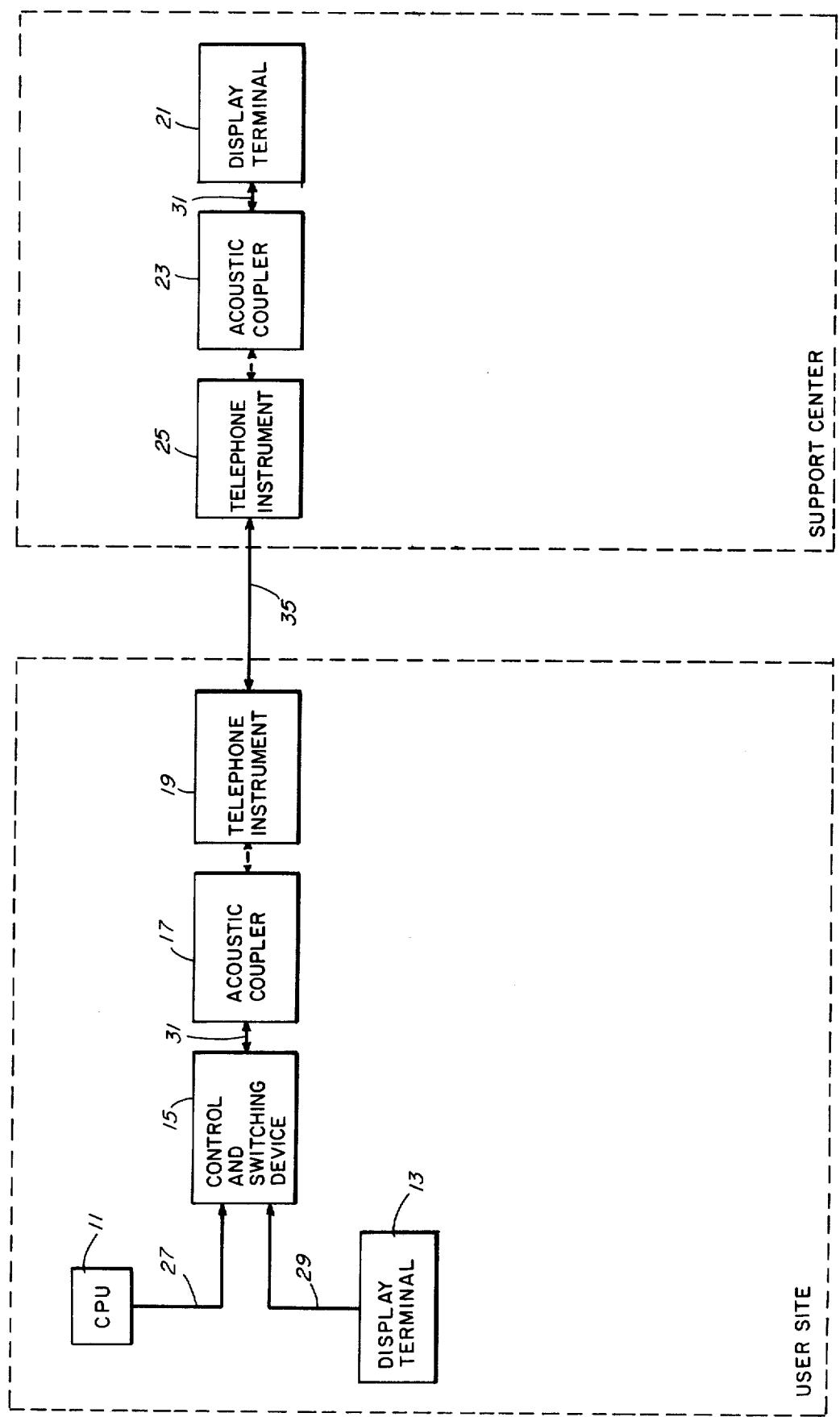
FIG. 1 is a block diagram of a system incorporating the teachings of this invention.

Referring now to the drawings, there is shown in FIG. 1 a CPU 11, a display terminal 13, a control and switching device 15, an acoustic coupler 17 and a telephone instrument 19 at a user site or first location and a display terminal 21, an acoustic coupler 23 and a telephone instrument 25 at a support center or second location.

Control and switching device 15 is connected to CPU 11, display terminal 13 and acoustic coupler 17 by lines 27, 29 and 31 respectively and display terminal 21 is connected to acoustic coupler 23 by a line 33. Telephone instruments 19 and 25 are each connected to a telephone line 35.

CPU 11 and display terminal 13 constitute a user site computer.

In the absence of a link between acoustic coupler 17 and acoustic coupler 23, display terminal 13 communicates with CPU 11 through control and switching device 15 over lines 27 and 29 as if directly connected to CPU 11, the data flowing between CPU 11 and display terminal 13 at a BAUD rate set by CPU 11 and display terminal 13.

When a telephone link is established between telephone instruments 19 and 25 over telephone line 35, personnel at the user site and personnel at the support center can converse with each other in a voice mode.

A data link between acoustic coupler 17 and acoustic coupler 23 is established by first establishing a telephone link between telephone instruments 19 and 25 and then coupling telephone instruments 19 and 25 to acoustic couplers 17 and 23 respectively. Once the data link is established, display terminal 21 is operable with display terminal 13 in either an on-line mode or a conversational mode. In the on-line mode display terminal 13 and display terminal can each input to CUP 11 with the outputs from CPU 11 being displayed simultaneously at both display terminals. In the conversational mode, CPU 11 is disengaged from both display terminals and inputs from each display terminal are displayed simultaneously on both display terminals. In both modes of operation the data is transmitted at BAUD rates set by control and switching device 15 and limited by acoustic couplers 19 and 23.

CPU 11 is any known type such as the NOVA 3 CPU made and sold by Data General Corporation of Westboro, Massachusetts. Display terminal 13 is any known type that is operable with CPU 11. Display terminal 13 may be, for example, a Model No. 6053 display terminal made and sold by the Data General Corporation of Westboro, Massachusetts. Display terminal 21 is any type of display terminal operable with CPU 11 and can be, but does not have to be, the same type of display terminal as display terminal 13 or even made by the same manufacturer as display terminal 13.

Acoustic couplers 17 and 23 are any type of acoustic couplers which can operate as a pair; that is, one being operable in an originate mode and the other in an answer mode and are adjusted to have the same BAUD rates. For example, acoustic coupler 17 may be the Model No. FM 310 originate acoustic coupler made and sold by Multi-Tech Systems, Incorp. of Minneapolis, Minnesota, and acoustic coupler 23 may be the Model FM 310 answer acoustic coupler also made and sold by Multi-Tech Systems, Incorporated of Minneapolis, Minnesota, both of such acoustic couplers being designed to transmit and receive asynchronous serial digital data at BAUD rates up to 450. Telephone instruments 19 and 25 are both standard type telephone instruments having a receiver which can be coupled with an acoustic coupler and can either be dial or touchtone type instruments. Telephone line 35 is any type of two wire telephone line capable of transmitting voice and data information.

The flow of data between display terminal 13, display terminal 21 and CPU 11, the operation of the system in the on-line and conversational modes when the data link is established, the switching from one mode to the other and the control of the BAUD rates depending on whether the data link is established are all controlled through control and switching device 15.

Figure 2:
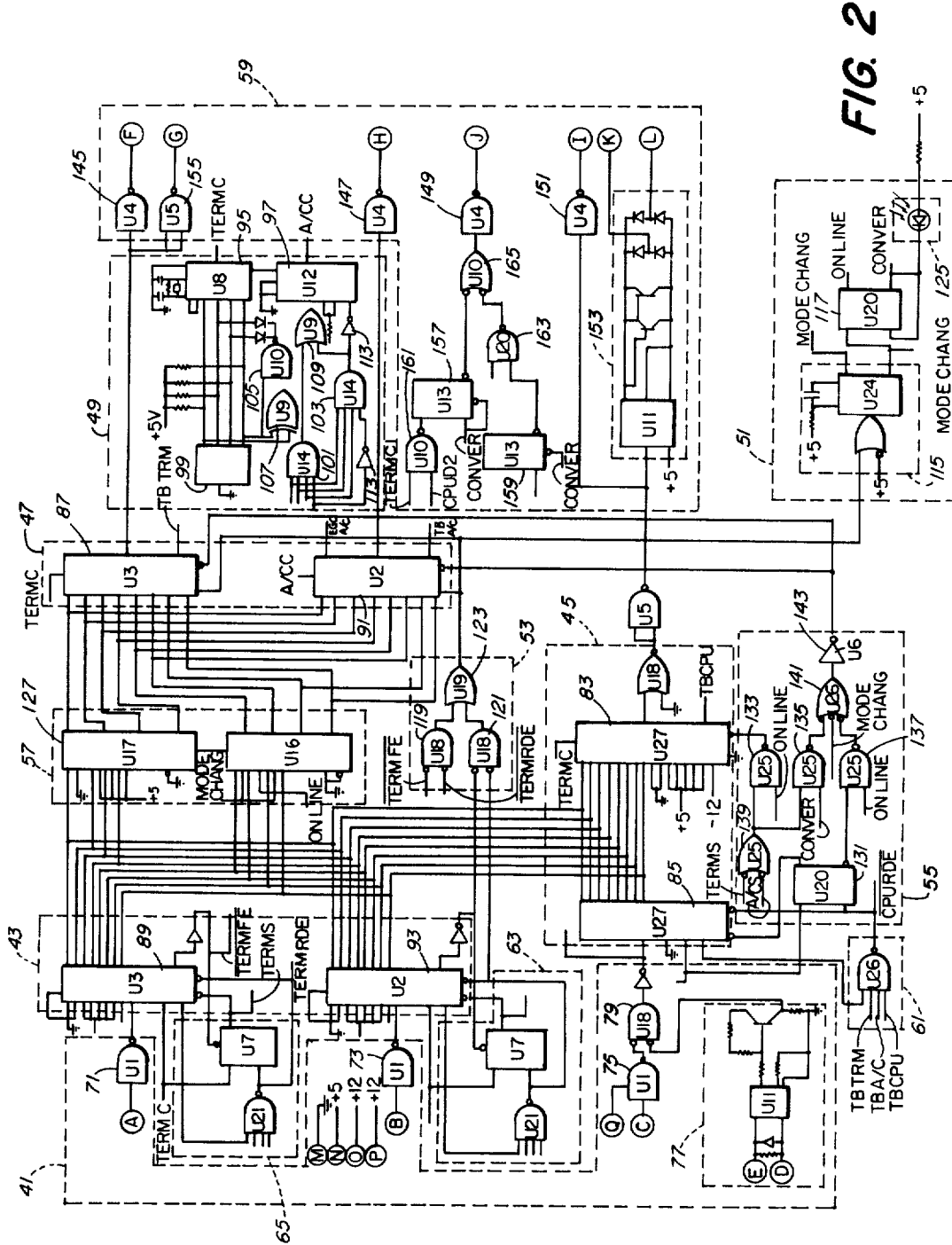
FIG. 2 is a circuit diagram of the control and switching device shown in FIG. 1.
Figure 3:
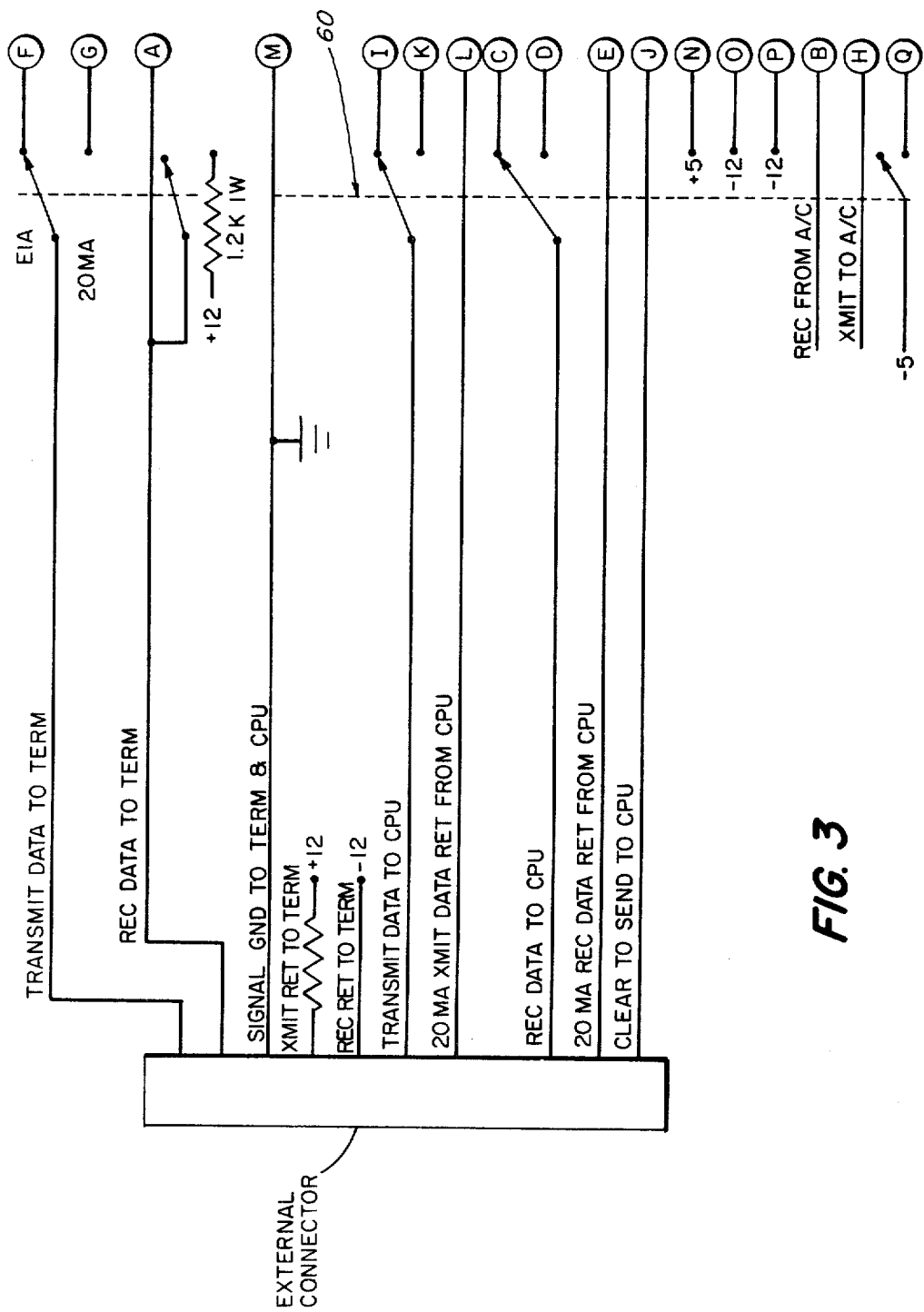
FIG. 3 is a circuit diagram of a switch forming a part of the receiver section of the control and switching device shown in FIG. 1.

As can be seen in FIG. 2, control and switching device 15 includes a receiver section 41, a character buffer section having three parts 43, 45 and 47, a BAUD rate control section 49, a mode control section having two parts 51 and 53, a mode indicator section having two parts, 55 and 57, a transmit section 59 a 20 MA-EIA six pole double throw switch 60, and interconnecting logic sections 61, 63 and 65.

Receiver section 41 receives EIA and 20 MA current loop serial data from CPU 11, acoustic coupler 17 and display terminal 13 and converts the data to TTL logic levels. The section includes three EIA receivers 71, 73 and 75, a 20 MA receiver 77 and an AND gate 79. Receiver 71, which receives data from display terminal 13, accepts either EIA or 20 MA current loop data as determined by switch 60. The receiver which receives data from the CPU 11 is either EIA receiver 73 or 20 MA receiver 75 depending on the setting of switch 60. The data from receiver 75 and receiver 77 is gated to the character buffer section 45 through AND gate 79. Receiver 73 receives EIA data from acoustic coupler 17 and is not effected by the setting of switch 60.

The character buffer section takes the TTL serial data from the receiver section 41 and converts it to parallel data. The section includes three UART devices, one for CPU 11, one for display terminal 13 and one for acoustic coupler 17. The UART device connected to CPU 11 includes a transmitter section 83 and a receiver section 85, the UART device connected to display terminal 13 includes a transmitter section 87 and a receiver section 89 and the UART device connected to acoustic coupler 17 includes a transmitter section 91 and a receiver section 93.

The BAUD rate section 49 controls the speed at which the UARTS in the character buffer section operate. The section includes two crystal controlled bit rate generators 95 and 97, a binary coded decimal data rate switch 99, three AND gates 101, 103 and 105, a pair of OR gates 107 and 109 and a pair of inverters 111 and 113. Bit rate generator 95 supplies clock signals to UARTS 91 and 93 to allow acoustic coupler 17 to operate at 110, 150 or 300 BAUD. The other bit rate generator 97 supplies clock signals to the other two UARTS to allow display terminal 13 to operate at all standard BAUD rates from 110 to 19.2 KB. Switch 99 provides BCD inputs to the bit rate control circuitry and the bit rate control circuitry supplies rate control signals to generators 95 and 97, allowing a maximum BAUD rate between display terminal 13 and CPU 11 while limiting the BAUD rate to and from acoustic coupler 23 to 300 BAUD.

The mode control section controls the serial data input to the appropriate transmitters. The section includes a one shot multivibrator 115, a flip flop 117, two AND gates 119 and 121, an OR gate 123 and an LED 125. In operation, the mode control section detects the presence of the mode change character (Break Key) and controls the serial data input to the appropriate transmitters. The Break character is recognized by the generation of Framing Error by either the acoustic coupler receiver UART or the display terminal receiver UART. Recognition of a Break character toggles the mode control FF by firing one shot multivibrator 115 to either an on-line mode side or a conversational mode side.

The mode indicator section causes a prompt character to be transmitted to display terminal 13 and display terminal 21 each time a Break key is activated. The section includes two quad 2 to 1 MUX's 127 and 129, a flip flop 131, three AND gates 133, 135 and 137, a pair of OR gates 139 and 141 and an inverter 143. The prompt character is gated to display terminal 13 and display terminal 21 each time the Break Key is activited. The prompt character is gated to the display terminal UART section and the acoustic coupler UART section each time FE (Framing Error) is generated as a result of pressing Break. The data configuration of the prompt character is determined by the state of the MODE Control FF. When in the on-line mode a ASC 11 136 (up arrow ↑ or ∧) is transmitted and when in the Conversational Mode an ASC 11 176 (tilde ∼) is transmitted.

The transmit section 59 transmits EIA and 20 MA current loop serial data to CPU 11, display terminal 13 and EIA data display terminal 21. The section includes EIA transmitters 145, 147, 149 and 151, a 20 MA transmitter circuit 153, a 20 MA transmitter 155, a pair of flip flops 157 and 159, a pair of AND gates 161 and 163 and an OR gate 165. Transmission to display terminal 13 is achieved by selecting either EIA transmitter 145 or 20 MA current loop transmitter 155, the selecting being determined by switch 60. Transmission to CPU 11 is achieved by selecting either EIA transmitter 151 or 20 MA current loop transmitter 153 as determined by the setting of switch 60. Transmission to acoustic coupler 17 is achieved through EIA transmitter 147, transmitter 149 and the various gating logic associated with it control the clear to send signal back to CPU 11. This signal controls transmission to CPU 11 depending on the mode selected.

When operating in the on-line mode, entries made from either display terminal 13 or by display terminal 21 are transmitted through control and switching device 15 to CPU 11, reflected back by CPU 11 and appear simultaneously at display terminal 13 and display terminal 21. Simultaneous data transfer to display terminal 13 and display terminal 21 is achieved through transmitter 149 by dropping Clear-to-Send to CPU 11 between characters. BAUD rate buffering is accomplished by moving data from the UART receivers to the UART transmitter. Since the data is displayed at both display terminals simultaneously, problems relating to response time during interactive operations can be diagnosed remotely at the support center. When operating in the conversational mode transmission of information to CPU 11 is inhibited. Entries made at either display terminal are reflected by control and switching device 15 and displayed simultaneously on both display terminals. Transmissions of data from CPU 11 to control and switching device 15 is inhibited by transmitter 149 dropping clear to send.

The parts making up control and switching device 15 may be in the form of IC chips or sections of IC chips and as listed in the following table:

| COMPONENT NUMBER | CHIP TYPE | MANUFACTURER |
|---|---|---|
| U1 | MC 1489AL | Motorola Corp. |
| U2 | AY-S-1013R | General Instrument Corp. |
| U3 | AY-5-1013A | General Instrument Corp. |
| U4 | MC 14881 | Motorola Corp. |
| U5 | 75452 | Texas Instrument Corp. |
| U6 | 74LS04 | Texas Instrument Corp. |
| U7 | 74LS74 | Texas Instrument Corp. |
| U8 | 4702 BDC | Fairchild Semi-conductor Corporation |
| U9 | 74LS 86 | Texas Instrument Corp. |
| U10 | 74LS00 | Texas Instrument Corp. |
| U11 | MTC2 | Motorola Corp. |
| U12 | 4702 BOC | Fairchild Semi-conductor Corporation |
| U13 | 74LS74 | Texas Instrument Corp. |
| U14 | 74LS21 | Texas Instrument Corp. |
| U16 | 74LS157 | Texas Instrument Corp. |
| U17 | 74LS157 | Texas Instrument Corp. |
| U18 | 74LS02 | Texas Instrument Corp. |
| U19 | 74LS32 | Signitics Corp. |
| U20 | 74LS74 | Texas Instrument Corp. |
| U21 | 74LS20 | Texas Instrument Corp. |
| U24 | 9LL02 | Fairchild Semi-conductor Corporation |
| U25 | 74LS00 | Texas Instrument Corp. |
| U26 | 74LS20 | Texas Instrument Corp. |
| U27 | AY-S-1013A | General Instrument Corp. |

As can be appreciated, the invention allows the user site to maintain complete physical control over the remote connection to the support center but yet allows instant and direct access to the support center.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. Apparatus for use in monitoring and controlling the operations of a computer at user site from a support center remote from said user site over a telephone line, said computer including a CPU and a display terminal, said apparatus comprising:

a. a display terminal at said support center, b. means for coupling said display terminal at said support center to said telephone line, said coupling means including an acoustic coupler, c. a control and switching device at said user site connecting said CPU to said display terminal at said user site, and d. means connecting said control and switching device to said telephone line, said connecting means including an acoustic coupler, e. said control and switching device including circuitry for enabling said display terminal at said user site to communicate directly with said CPU in the absence of a link with said display terminal at said support center over said telephone line at a BAUD rate set by said display terminal at said user site and said CPU and circuitry for enabling said display terminal at said support center to operate along with said display terminal at said user site at BAUD rates set by said control and switching device and limited by said acoustic couplers in an on-line mode wherein each display terminal can input to said CPU and the output from said CPU is displayed simultaneously at both of said display terminals and a conversational mode wherein said CPU is disengaged from said display terminal at said user site and inputs from either display terminal are displayed at both display terminals when said link is established, said modes of operation being controllable by circuitry located in said display terminal at said user site.

2. The apparatus of claim 1 and wherein said control and switching device further includes circuitry responsive to signals from said display terminal at said user site for switching between said on-line mode and said conversational mode.

3. The apparatus of claim 2 and wherein said control and switching device further includes circuitry for lowering the BAUD rate at which data is transmitted between said CPU and said display terminal at said user site when a data link is established.

4. The apparatus of claim 3 and wherein said control and switching device further includes switching circuitry for allowing said device to receive either EIA type data or 20 MA data from said display terminal at said user site.

5. The apparatus of claim 4 and wherein said control and switching device is designed so that data is transmitted between said CPU and said display terminal at BAUD rates up to around 19.2 KB in the absence of a data link and to both display terminals simultaneously at BAUD rates up to around 300 B when a data link is established.

6. The apparatus of claim 5 and wherein said means for coupling said control and switching device to said telephone line comprises a telephone instrument connected to said telephone line.

7. The apparatus of claim 6 and wherein said acoustic coupler at said user site is designed to transmit data up to about 300 BAUD.

8. The apparatus of claim 7 and wherein said means for coupling said display terminal at said support center to said telephone line is designed to transmit data at the same BAUD rate as said acoustic coupler at said user site.

9. The apparatus of claim 8 and wherein said means for coupling said display terminal at said support center to said telephone line includes a modem.

10. The apparatus of claim 8 and wherein said means for coupling said display terminal at said support center to said telephone line comprises a telephone instrument connected to said telephone line.

11. A computer system comprising:

a. a CPU at a first location, b. a display terminal at said first location, c. a control and switching device at said first location, d. means connecting said CPU to said control and switching device, e. means connecting said display terminal at said first location to said control and switching device, f. an acoustic coupler at said first location connected to said control and switching device, g. a telephone instrument at said first location connected to a telephone line, h. a display terminal at a second location, and i. means coupling said display terminal at said second location to said telephone line, j. said control and switching device including circuitry allowing said display terminal at said first location to communicate with said CPU in the absence of a link between said acoustic coupler and said display terminal at said second location at a BAUD rate set by said display terminal at said first location and said CPU and allowing said display terminal at said second location to operate along with said display terminal at said first location at BAUD rates set by said control and switching device and limited by said acoustic coupler in an on-line mode wherein each display terminal can input to said CPU and the output from said CPU is displayed simultaneously at both of said display terminals and a conversational mode wherein said CPU is disengaged and inputs from either display terminal are displayed at both display terminals, in the presence of such a link.

12. Apparatus for use in monitoring and controlling the operations of a computer at user site from a support center remote from said user site over a telephone line, said computer including a CPU and a display terminal, said apparatus comprising:

a. a display terminal at said support center, b. means for coupling said display terminal at said support center to said telephone line, said coupling means including an acoustic coupler, c. a control and switching device at said user site connecting said CPU to said display terminal at said user site, and d. means connecting said control and switching device to said telephone line, said connecting means including an acoustic coupler, e. said control and switching device including circuitry for enabling said display terminal at said user site to communicate directly with said CPU in the absence of a link with said display terminal at said support center over said telephone line at a BAUD rate set by said display terminal at said user site and said CPU and circuitry for enabling said display terminal at said support center to operate with said display terminal at said user site at BAUD rates set by said control and switching device and limited by said acoustic couplers in either an on-line mode wherein each display terminal can input to said CPU and the output from said CPU is displayed at both of said display terminals or a conversational mode wherein said CPU is disengaged from said display terminal at said user site and inputs from either display terminal are displayed at both display terminals when said link is established, said modes of operation being controllable by said display terminal at said user site and wherein said control and switching device includes:

i. a receiver section for receiving serial data from said CPU, said user site telephone coupling means and user site display terminal and converting said data to TTL logic levels, ii. a character buffer section coupled to said receiver section for converting said serial data in TTL logic levels from said receiver section to parallel data, said character buffer section including three UART devices, one coupled to said CPU another coupled of said user site display terminal and the third coupled to said user site acoustic coupler, iii. a BAUD rate control section coupled to said character buffer section for controlling the BAUD rate of the data passing through said UART devices in said character buffer section, iv. a mode control section coupled to said character buffer section for controlling the serial data inputs to said UART devices, v. a mode indicator section coupled to said character buffer section for supplying signals indicating the mode of operation, vi. a transmit section coupled to said character buffer section for transmitting data from said character buffer to said CPU and said display terminals, and vii. a switch coupled to said mode control section for switching from one mode of operation to another.

* * * * *